United States Patent [19]

Lageder et al.

[11] Patent Number: 4,801,216

[45] Date of Patent: Jan. 31, 1989

[54] DEVICE FOR GENERATING A PRESTRESS WHEN TWO CONNECTION PARTS ARE COUPLED RIGIDLY

[75] Inventors: Heinrich Lageder, Würenlingen; Jaroslav Masek, Wettingen; Kamil Prochazka, Windisch, all of Switzerland

[73] Assignee: BBC Brown, Boveri & Company, Ltd., Baden, Switzerland

[21] Appl. No.: 898,340

[22] Filed: Aug. 20, 1986

[30] Foreign Application Priority Data

Sep. 2, 1985 [DE] Fed. Rep. of Germany ....... 3531300

[51] Int. Cl.⁴ ............................................. F16D 1/06
[52] U.S. Cl. ........................................ 403/24; 29/452; 29/455; 403/345
[58] Field of Search ............... 29/44 C, 452, 455, 234; 403/24, 299, 345; 411/8, 9, 13, 14, 383, 384, 392, 395

[56] References Cited

U.S. PATENT DOCUMENTS

| 2,844,363 | 7/1958 | Clark | 29/446 |
| 3,080,778 | 3/1963 | Alcorn, Jr. | 72/456 |
| 3,246,394 | 4/1966 | Meyer | 29/446 |
| 4,538,442 | 9/1985 | Reed | 29/455 R |

Primary Examiner—P. W. Echols
Attorney, Agent, or Firm—Burns, Doane, Swecker & Mathis

[57] ABSTRACT

To generate a prestress between a piston rod (1) and a valve spindle (2), a bar (5) is incorporated in the piston rod (1) and is prestressed against the valve spindle (2) by exerting a pressure force, which absorbs the pulling and pushing forces occurring there.

2 Claims, 1 Drawing Sheet

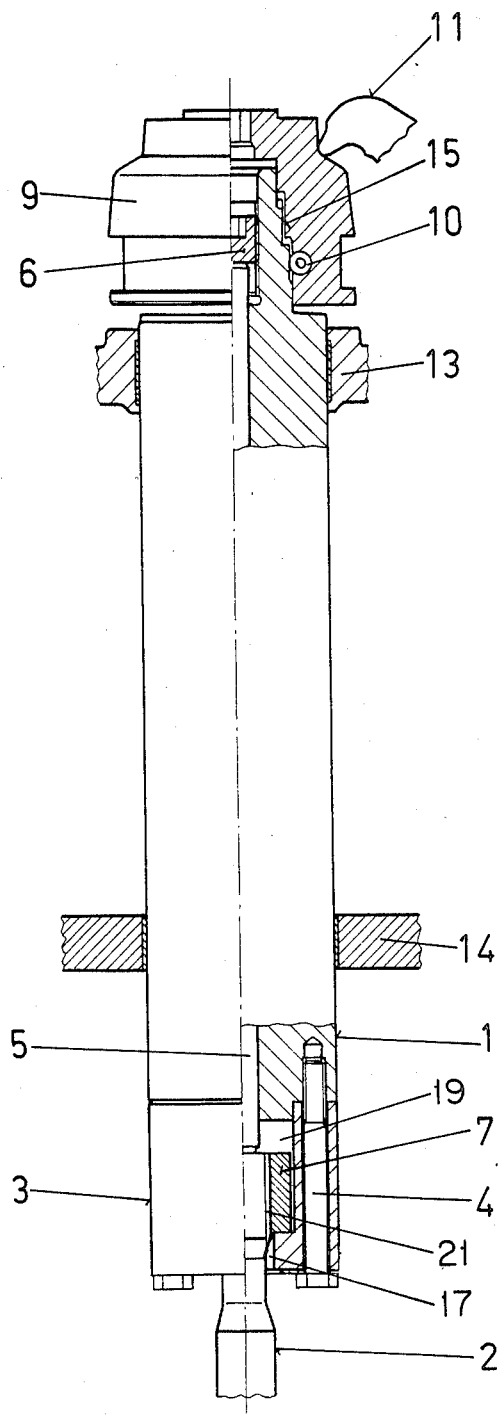

DEVICE FOR GENERATING A PRESTRESS WHEN TWO CONNECTION PARTS ARE COUPLED RIGIDLY

FIELD OF THE INVENTION

The present invention relates to a mechanical connection and specifically to an apparatus for generating a prestress in a connection between two rigidly coupled connecting parts.

Rigid coupling connections with high alternating loads which occur frequently always call for a prestressed coupling of the two coupling connection parts acting relative to one another. Such a precaution is unavoidable, for example when a piston rod is connected to a valve spindle in control valves. Here, in particular, it is not sufficient to connect the valve spindle to the piston rod, but a prestress must also act on the valve spindle, so that even after x number of strokes the predetermined longitudinal displacement can be transmitted free of play to the piston rod.

According to a known method often used to achieve the desired state, the necessary prestress exerted on the valve spindle, which depends on the maximum valve spindle thrust occurring, is generated by installing springs or laminated springs which are then prestressed appropriately by being compressed. This is a technique which, in general, is also used in other rigid coupling connections.

The installation of helical springs or cup springs always requires a large amount of space, precisely where the conditions as regards space are always restricted, as where coupling connections are concerned. However, even when sufficient space is available, it must be remembered that the increase in mass resulting from the extra space requirement and from the spring installations has an adverse effect on the adjustability and movability of the connection. If high prestresses have to be achieved, the conditions as regards space become even more restricted and the mass to be moved even greater.

OBJECTS AND SUMMARY OF THE INVENTION

The invention is intended to remedy this.

One of the many objects on which the invention, as defined in the claims, is based is, in a device of the type mentioned in the introduction, to generate the prestress between two rigidly coupled coupling connection parts by means which do not require any additional space.

The essential advantages of the invention are to be seen in the fact that the prestress is produced by means of a bar of preferably cylindrical cross-section which, within its elastic range, is compressed against the connected coupling connection part. It is thus possible, by varying the length, thickness and material properties of such a bar, to produce the particular ideal prestress between the two coupling connection parts.

BRIEF DESCRIPTION OF THE DRAWING

An exemplary embodiment of the invention is illustrated diagrammatically below with reference to the drawing.

The single FIGURE of the drawing shows a piston rod with a connected valve spindle as detached components of a control valve.

All elements not required for a direct understanding of the invention are omitted.

DETAILED DESCRIPTION OF THE PREFERRED EMBODIMENT

The FIGURE shows a piston rod 1, such as is conventionally incorporated in control valves. At the head end, the piston rod 1 is provided with a link 9, the characteristic of which is transmitted via the return lever 11 to the return bush (not shown). The link 9 itself is screwed onto the piston rod 1 at screw threads 15 and is fixed to the piston rod 1 by means of a tangential key 10. The other end of the piston rod 1 is designed for the connection of the valve spindle 2. This is supplemented on the same side as the piston rod with a threaded bush 7, thereby producing an annular step surface. The sleeve 3 attached on the same side as the valve spindle is provided with a first hole 17 extending therethrough which is large enough to permit the passage of the valve spindle 2 but which is smaller in diameter than the threaded bush 7. The sleeve 3 is further provided with a partially drilled through opening 19 which extends in a direction colinear with the first hole 17 and which has a diameter large enough to accommodate the threaded bush 7 between the piston rod 1 and the sleeve 3. By this construction, the valve spindle 2 may be passed through the first hole in the sleeve 3 and fastened to the bush by the screw threads 21. The connection between the sleeve 3 and the piston rod 1 is made by means of a number of screws 4. Thus, the threaded sleeve 7 transmitting force to the piston rod 1 is restrained in the pulling direction of the valve spindle 2. The valve spindle 2 is secured in the pushing direction by a bar 5 of circular cross-section which is inserted into the drilled-through piston rod 1 and which is pressed against the end face of the valve spindle 2 by the threaded bolt 6. At the same time, the bar 5 is not only pressed free of play against the valve spindle 2, but is compressed as a result of a further previously calculated turn of the threaded bolt 6, until a prestress originating from the bar 5 is obtained. The prestressing force acting on the valve spindle 2 can absorb the forces occurring there, so that the connection between the valve spindle 2 and the piston rod 1 is fatigue-free. For this particular connection, this is an indispensible precondition in that the coupling always remains free of play, with the result that the movements are transmitted correctly.

Of course, the bar 5 may only be prestressed by means of pressure in accordance with Hooke's law on which it is based. However, the necessary prestressing forces can be maintained without difficulty by means of the variables, such as the length, thickness and material properties of the bar 5. Long bars 5 with a high prestressing force will certainly tend to assume a wavy linear shape; moreover, this does not matter when the play between the bar 5 and the bore is deliberately kept small. It is easy to readjust or check the prestressing force: the tightening wrench can be inserted through the orifice in the end face of the link 9.

The mounting 13,14 of the piston rod 1 is indicated merely by way of example.

While this invention has been illustrated and described in accordance with a preferred embodiment, it is recognized that variations and changes may be made therein without departing from the invention as set forth in the claims.

What is claimed is:

1. A connection arrangement in a control valve comprising:

an elongated piston rod having first and second axial ends and an opening extending between said ends;

a valve spindle having an end adjacent the first end of said piston rod, means for maintaining the end of said valve spindle in the vicinity of the first end of the piston rod to form a connection between the piston rod and the valve spindle;

a compressive force transmitting member mounted in the opening of said piston rod, said force transmitting member having first and second axial ends, said first axial end of the force transmitting member abutting the end of said valve spindle; and force generating means positioned at the second end of said piston rod in contact with the second end of said force transmitting member for generating a compression force on the second end of said force transmitting member so as to prestress said valve spindle at the connection.

2. The connection arrangement according to claim 1, wherein said force generating means includes an end member and a bolt threadedly received in said end member, said bolt being axially aligned with said force transmitting means and being axially adjustable to change the amount of force acting on said force transmitting means.

* * * * *